United States Patent

[11] 3,619,535

| [72] | Inventor | Vincent J. Sullivan<br>21 Evergreen Drive, Kentfield, Calif. 94904 |
|------|----------|---|
| [21] | Appl. No. | 859,421 |
| [22] | Filed | Sept. 19, 1969 |
| [45] | Patented | Nov. 9, 1971 |

[54] PIPE-WELDING PROCESS
9 Claims, 7 Drawing Figs.

[52] U.S. Cl. .................................................. 219/8.5, 219/67
[51] Int. Cl. ................................................. H05b 5/00, B23k 31/06
[50] Field of Search ........................................... 219/8.5, 67

[56] References Cited
UNITED STATES PATENTS

| 2,687,465 | 8/1954 | Crawford | 219/8.5 |
| 3,089,021 | 5/1963 | Hawes et al. | 219/104 |
| 3,127,674 | 4/1964 | April | 219/67 X |

*Primary Examiner*—J. V. Truhe
*Assistant Examiner*—Hugh D. Jaeger
*Attorney*—Townsend and Townsend

ABSTRACT: This is an improved process of induction welding of steel pipe and an improved product of such process. After steel skelp is formed into a tubular blank with an open longitudinally extending seam, the seam edges are continually heated, converged and pressure-welded. Heat is applied to the converging edges in a novel manner to eliminate entrapment of harmful scale during welding, to prevent thermal stressing or cracking of the seam after welding, to arrest the growth of martensite and to produce a pipe product characterized by a substantially pure metal interface extending the width of the pipe wall.

PATENTED NOV 9 1971
3,619,535
SHEET 1 OF 2
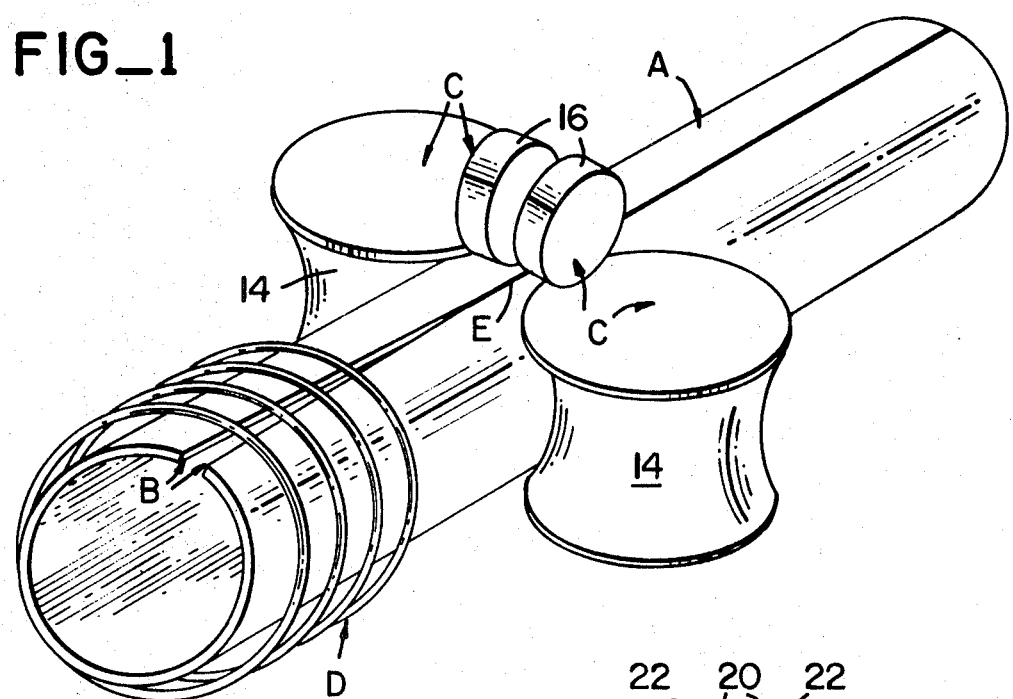
FIG_1
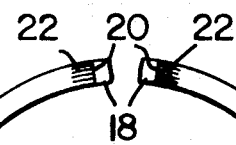
FIG_2
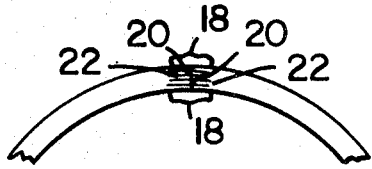
FIG_3
FIG_4
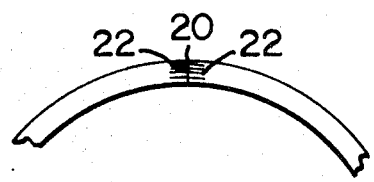
FIG_5
*INVENTOR.*
VINCENT J. SULLIVAN
BY
*Townsend and Townsend*
ATTORNEYS

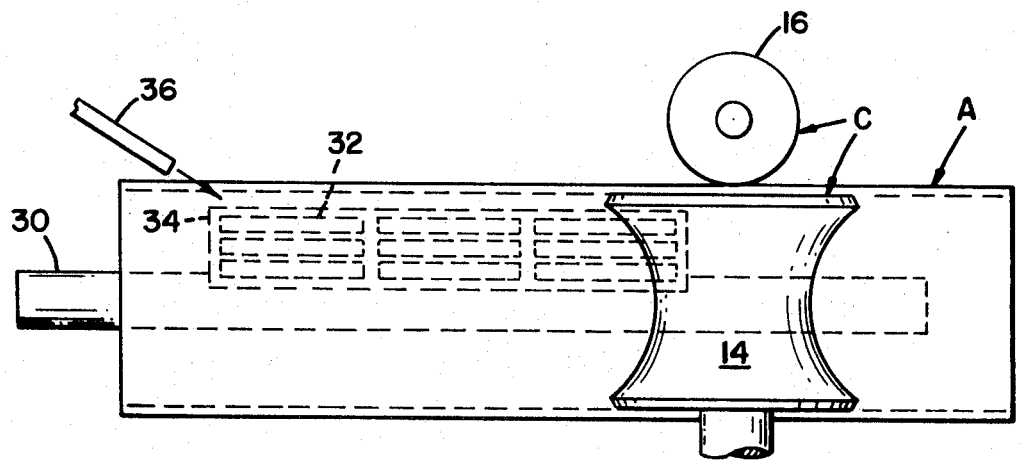
FIG_6
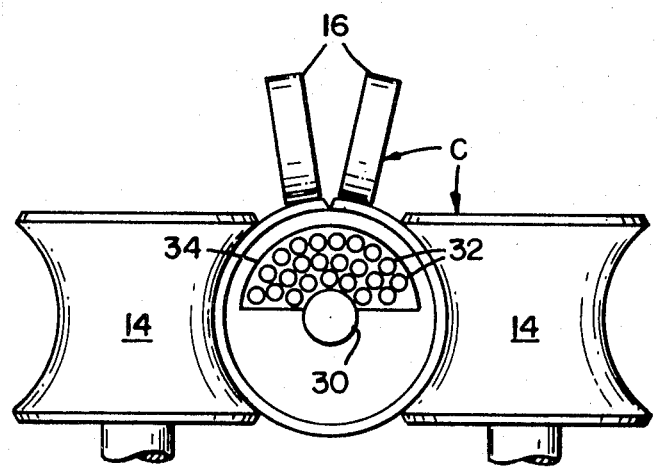
FIG_7
INVENTOR.
VINCENT J. SULLIVAN
BY
Townsend and Townsend

PIPE-WELDING PROCESS

This invention relates to the formation of steel pipe by an improved welding process and the improved product of such process. Particularly, the process relates to the formation of induction-welded pipe having a longitudinally extending or spiraling weld seam.

The formation and welding of skelp into a tube or pipe is rather well known in the prior art. See Vassar U.S. Pat. No. 3,014,118. A tubular blank has its edges heated and thereafter closed under pressure to weld the seam and form a pipe. Prior to welding, the edges are typically heated by passing the blank through a fluctuating magnetic field upstream of the point of edge convergence. This fluctuating magnetic field induces concentrated alternating electric current to the point of seam convergence for producing heat necessary for welding. Such process is more specifically disclosed in the Crawford U.S. Pat. Nos. 2,687,464 and 2,687,465.

The above-referenced welding processes have heretofore produced steel pipe having defects including entrapped scale in the weld, intermittent pressure welds along the seam length, thermally stressed welds, and welds containing martensite. It has been discovered that these defects result from the rapid removal of heat during the welding process and more particularly from quenching the pipe prior to, during and after welding of the pipe seam.

Prior to welding, quenching causes cooling of the scale disposed along the outside of the converging edges. The cooled scale remains in large solid particles which subsequently become entrapped in the weld. Further, quenching prevents the converging edges from reaching the desirable uniform plastic state. Instead, the edges include intermittently dispersed particles of metal in the solid state. These solid particles also become wedged between the converging edges of the tubular skelp and prevent the formation of a pure pressure weld along a solid metal interface. The resultant weld retains large portions of unextruded plasticized metal, which portions when cooled, form a weak weld.

Immediately after welding, quenching causes rapid cooling of the weld. This produces thermal cracking and causes the formation of martensite—a brittle crystalline formation having poor impact resistance. Harmful martensite must be eliminated. This is usually done by a post heating step commonly referred to as annealing or normalizing.

A primary object of this invention is to provide a welding process which produces a steel pipe weld having a substantially pure metal interface. Accordingly, a tubular blank is heated to form to contiguous zones, each of which extends the width of the blank wall, and lengthwise along the seam edges in the vicinity of their point of convergence. First outer zones at the seam edges are uniformly heated to the plastic state. Second inner zones each contiguous to a first zone are heated in the solid state and immediately below the plastic state. The seams are converged and pressure-welded without quenching or removal of the heat from the edges. This prevents the plasticized zones from containing intermittent segments of metal in the solid state which could block convergence of the seams and causes bonding of the weld at a solid metal interface extending the width of the pipe wall.

A further object of this invention is to set forth criteria for accurately establishing the depth of the plasticized and heated contiguous zones.

A still further object of this invention is to eliminate scale entrapment in the weld by heating the scale to a conductive and nonmagnetic state where it can be repelled from the weld by the field forces, vibrating the skelp to disperse the scale particles disposed on the converging seams, and extruding the scale with waste skelp when the pipe is formed.

An advantage of this invention is that the relatively low frequency of the fluctuating magnetic field in the preferential range of 3 k.c. to 100 k.c. permits a low voltage of not more than 800 volts to be maintained. This low voltage prevents arcing between the coil and blank and permits the use of a relatively large current flow to generate the desired inductive field for heating the tubular blank.

An advantage of the preferential frequency used with this invention is that vibrations are imparted to the heated zones. These vibrations prevent the growth of large bond weakening metallic crystals within the heated solid zones immediately adjoining the weld.

A further advantage of this invention is that steels having relatively narrow temperature ranges in the plastic state now allow a more uniform heat and can be readily welded. The heated solid state zones, contiguous each of the plasticized zones, retard the heat outflow from the plasticized edge to the body of the tubular blank. This retardation prevents the heat at the edges from rapidly being lost to the solid cold material of the blank enabling the temperature of the converging edges to be controlled within narrow limits.

A still further advantage of this invention is that thermal cracking or stressing of the weld is eliminated. The heated zones, as bonded together on either side of the weld interface, provide a retarded heat outflow from the weld to the cold body of the tubular blank, cooling the weld through the thickness of the pipe wall at a uniform and retarded rate.

A still further advantage of the bonded heated zones is that their retarded cooling rate arrests the formation of martensite crystals in the case of ferrous materials and consequently dispenses with the need for annealing or normalizing.

A further advantage of this invention is that absent liquid quenching steam is not a byproduct of the process. This enables pyrometers to be used to control the temperature of the seam edges, eliminates the necessity of protecting the electrical insulation of the welder against the destructive effects of steam, and prevents impeders used with the welder from becoming coated and encrusted with damp scale particles.

An additional advantage of this invention is that the weld maintained in a ductile state enabling it to be easily worked during sizing of the pipe.

Other objects, features and advantages of the present invention will be more apparent after referring to the following specification and attached drawings in which:

FIG. 1 is a perspective view of an induction pressure welding apparatus showing the skelp formed into a tubular blank advancing from an upstream point where its seams are separated and opposed to a downstream point where they are joined under pressure by squeeze rollers to form welded pipe:

FIG. 2 is a cross section of the pipe in FIG. 1 illustrating the physical state of the skelp edges immediately before welding:

FIG. 3 is a partial cross section of the pipe in FIG. 1 downstream of the section of FIG. 2 illustrating the weld immediately after the edges begin to converge;

FIG. 4 is a partial cross section illustrating the finished weld before trimming of the extruded plastic layer therefrom;

FIG. 5 is a cross section illustrating the pipe immediately after welding;

FIG. 6 is a side elevation of FIG. 1 showing the pipe broken away to illustrate the placement of an impeder within the pipe; and FIG. 7 is an end elevation view showing the pipe and impeder of FIG. 6.

With reference to FIG. 1, skelp is shown formed into a cylindrical blank A having an open longitudinal seam with opposed edges B. Blank A is continuously advanced towards squeeze rolls C where edges B are conjoined by pressure welding. An induction coil D upstream of the point of seam convergence E induces electric current within skelp A. This electric current, imparted in both sides of the blank underlying coil D is concentrated on the edges with the assistance of an impeder F at the point of seam convergence E. The concentrated current produces heating of the opposed seams as they pass from under coil D to a maximum heated state at their point of convergence where the seams can be readily pressure welded by squeeze rolls C.

The skelp utilized can be any ferrous metallic material capable of receiving electric current by induction from coil D and capable of sustaining a pressure weld. Such skelp can include mild steel, stainless steel and high-carbon steel alloys.

The blank is formed from a flat elongate strip of metal having parallel edges. Such forming is done by apparatus known in the art and for purposes of brevity will not be explained further herein.

Squeeze rolls C comprise two opposed side rolls 14 on either side of skelp A and two vertical rollers 16 oriented to press downwardly on the skelp in the vicinity of the point of seam convergence E. Rolls 14, disposed on either side of blank A, have cross-sectional configurations complementary to the blank sidewalls and continuously rotate as skelp A advances towards point E. The rolls are sized to supply additional curvature to the skelp and to advance the opposed edges B towards one another. Vertical rollers 16 maintain the alignment of the edges as they come together under pressure.

Induction coil D is located upstream of the point of seam convergence E. This coil D has an alternating current source (not shown) and produces a fluctuating magnetic field. The coil is located at a distance from the point of seam convergence to allow preheating of the edges and reduction of the temperature gradient and also to match the power source.

The alternating current used with coil D can vary in frequency between 3 k.c. and 450 k.c. but best results are obtained from 3 k.c. to 100 k.c. This range is considered critical to this invention because frequencies below 3 k.c. result in excess amounts of metal being squeezed out of the weld and insufficient pressures being created within the weld due to softness of the welded metal.

Frequencies above 450 k.c. cause the induced current to flow along a shallow current path across the converging edges. This shallow current path heats an extremely narrow layer of metal to a temperature, prevents the underlying layers from being heated, and promotes rapid self-quenching of the pipe with resultant thermal stressing welds and the formation of martensite. Such shallow current paths additionally heat the corners to the point where they are burned away so that the opposed edges B can no longer abut along flat surfaces but can form a pressure weld only over a portion of the pipe wall thickness.

The relatively low frequencies utilized in heating the skelp, and particularly the frequencies of the preferential range, have the additional effect of permitting voltages in the range of 800 volts to be used on the inductive coil. These low voltages, as compared to the 3,000 to 4,000 used on other induction welders, permit the use of relatively high currents (in the neighborhood of 5,000 amperes) to be used on the coil for the generation of a maximum magnetic field. Further, the low-voltage high-amperage coil permits a gap in the range of 1.25 inches to be maintained between the welded skelp and coil (as compared to a 0.25-inches gap required in prior induction-welding methods). This wide gap gives good mechanical and electrical clearances to the welded skelp.

The location of coil D relative to the point of seam convergence E is important. Typically, it is preferred to have the nearest loop of the coil approximately one pipe diameter removed from the point of seam convergence.

Movement of the coil away from the point of seam convergence results in substantial portions of the induced current bypassing the point of seam convergence. This bypassing current loops around portions of the pipe below and behind the point of seam convergence with resultant dissipation of heat in sections of the pipe removed from the point of welding. Movement of the coil toward the point of seam convergence results in insufficient heating of the skelp and causes high temperature gradients which contribute to cracking and stressing of the weld and may reduce welding speed.

In addition to the location of the coil, the length of the coil has been found to be important. Where the coil is of relatively short length, a concentrated current path is produced on the bottom and sides of the skelp wall. This concentrated current path results in considerable waster heat being generated at these points. Conversely, where the coil is too long, it has been found that substantial portions of the current bypass the point of seam convergence and instead complete a circuit around the back of the pipe. Adjustment of coil length can readily be made by a skilled operator.

The spatial separation of the coil and skelp passing therethrough, has additionally been found to be of importance. Typically, the cross-sectional area enclosed by the skelp and a line drawn across the two converging edges must be 80 percent or more of that cross-sectional area enclosed by the coil.

In the fabrication of all ferrous pipe, regardless of diameter, it has been found necessary to include an impeder in the interior of the pipe. The impeder functions to increase the field generated by the current in the converging seam edges. With the field increased, the current on the converging edges causes additional heating by means of transverse flux. It also acts as a core in a solenoid to reduce current around the inside of the pipe.

With reference to FIGS. 1, 6 and 7, the impeder F is illustrated. Typically, the impeder is supported on a mandrel 30. Mandrel 30 is supported at a point upstream of the coil (not shown) and extends concentrically of the skelp into and under the formed pipe. On its surface mandrel 30 supports a plurality of individual ferrite rods 32. Rods 32 are each disposed parallel to the axis of the skelp and mandrel and are confined within a housing 34 in a semicircular cross section below the converging edges. The edges of housing 34 are supported to maintain a clearance between the pipe being formed and the impeder. This clearance assures that minor fluctuations of the passing skelp towards and away from the impeder do not cause undue fluctuations in the current path at the converging seam edges.

The cross-sectional area of the impeder within housing 34 is determined by the frequency of the applied voltage and the saturation value of the particular ferrite rods 32 used in the impeder. This cross section may be calculated from the fundamental equation:

$$E = 4.44 f N O_m \times 10^{18}$$

where:
$E$ is the applied voltage of the coil;
$f$ is the frequency of the current applied to the coil;
$N$ is the number of turns of the coil; and
$O_m$ is the maximum flux of the total area of the impeder.

The length of the impeder can be determined empirically. Typically, where larger diameter pipe is used, the impeder must be of greater length for confining the current path between the coil and point of seam convergence. Moreover, the cross-sectional dimensions of the impeder will be limited by the space available in the pipe, it being apparent that pipes of smaller diameter will limit the area available for both the supporting mandrel and impeder F.

It will be noted that in the absence of quenching the impeder used in the disclosed apparatus is not subjected to being contacted with water. This maintains the surface of the impeder in a dry state where scale particles and other foreign materials cannot accumulate in a layer of encrusting and baked mud. Typically, the dry surface of the impeder is maintained free of such particles by a small blast of air from a jet 36 directed onto the surface of the impeder from between the converging edges. Although liquid quenching is eliminated from the welding process it has been found that the use of a liquid coolant after welding is helpful for purposes of shaping and straightening the pipe. More particularly, for such purposes liquid coolant may be applied at a distance of approximately 75 feet from the weld point to pipe moving at speeds up to 60 feet per minute. In such instance, the pipe is subjected only to ambient temperature during welding and also after welding at least until the pipe has cooled to a temperature below the temperature at and above which the crystalline formation known as austenite is formed. This temperature is sometimes hereinafter referred to as the "critical temperature."

Seams B are generally advanced in the vicinity of the point of seam convergence E towards one another at an angle in the range of 3° to 7°, the preferred angle of convergence being 5°. Typically, as the angle of convergence narrows, there is an increased tendency of the generated current to flashover. It has been found that the angle of seam convergence can readily be adjusted to an optimum by the skilled operator.

Squeeze rollers C bring opposed edges B into contact at a readily determined pressure sufficient to form a weld.

FIG. 2 illustrates the physical state of the separated seam edges B at a distance upstream of the point of seam convergence. Each edge has two contiguous transverse zones extending across the thickness of the blank wall, is heated to the plastic state. Plastic zones 18 each extend from abutting edges of the pipe inwardly along the skelp wall and terminate at the weld surface 20 where the wall of the tubular blank is in the solid state. Contiguous to first zones 18 at weld surface 20 and extending the width of the blank wall is a second solid zone 22 heated to a point immediately below plastic. This soild zone extends under the weld surface along each of the walls of the solid material of the skelp.

The required depth of the first heated zone 18 is dependent upon the wall thickness of the pipe, the frequency, the material being heated, and the extrusion characteristics of the metal being welded. Typically, this depth must be sufficient to permit all scale and dirt to be extruded from the welded interface of the metal when the edges are converged and pressure welded. The heated depth of the first zone is adjusted by either lowering the frequency within the given ranges of 3 k.c. to 450 k.c. for increased zone depth or by increasing the time in which each unit length of the pipe is exposed to the magnetic field of the coil.

Heated zone 22 is not the natural product of heat outflow from plasticized zone 20 to the cold material of the tubular blank A. As distinguished from the prior processes, energy is imparted to zone 22 to elevate both the temperature of the zone and the width of the zone to a state above that produced by natural heat outflow from the plasticized zones 20. It will be noted that zones 22 are in effect high-temperature heat sinks. These heat sinks retard the rate of heat outflow from the plasticized zones because of the lower temperature differential between the zones.

Regarding the formation of martensite, for every iron carbon solution, there exists a "critical temperature" at and above which the crystalline formation austenite is formed. Steel heated to this temperature can dissolve relatively large concentrations of carbon. Prior art welders have apparently heated the steel being welded to a range above the critical temperature, maintained the steel at this temperature for a sufficient length of time to permit the austenite to absorb a high carbon content from the contiguous steel, and thereafter cooled the austenite rapidly. When cooled rapidly, the austenite with its high carbon content enters into a new physical crystal structure with the iron known as martensite. This martensite is brittle and must be removed from welds by the annealing or normalizing process.

As distinguished from the prior art, this process displaces substantially all of the steel heated above the critical temperature. This steel is not in the weld but rather extruded from it with the first zone. The remainder of the steel in the second heated zone is either below the critical temperature at all times or alternately above the critical temperature at by only an extremely narrow margin and for such a short period of time that the austenite state, if it has time to come into existence at all, does not have the opportunity to dissolve carbon in sufficient amounts to enable martensite to subsequently form when it is cooled, Moreover, the heat sink formed by the bonded second zones arrests the rapid cooling of the metal of the weld, further inhibiting the formation of any martensite.

As the seam B advance into contact, plastic zones 18 remain over and cover weld surface 20. This covering of the weld surfaces has two effects. First, it prevents oxidation or scale formation along the welding surface, thereby preserving a clean and pure solid metal surface which can accept a pressure weld. Secondly, and in the case of steel, the plastic zones 18 prevent the carbon in the steel from becoming oxidized and passing out of solution with the iron, thereby preserving the carbon content of steel at the weld.

From the point in which the respective plastic zone first contact each other they are forced towards one another. This forcing causes the plastic zones to be displaced to the inside and the outside of the weld. In such displacement, as illustrated in FIGS. 3 and 4, the plastic zones remain in a covering disposition over the weld surface preventing either oxidation or decarbonization, as above mentioned. Within 6 inches of seam convergence air may be applied to blow off dirt or other contaminants.

As illustrated in FIG. 4, when the weld surfaces are moved one towards another under welding pressure, the plastic zones are completely displaced outwardly of the weld to the inside of the pipe and the outside of the pipe. As the plasticized zones are not quenched and consequently contain no solid particles, covergence of the edges occurs at weld surfaces 20, there being no solid particles to wedge between the surfaces and block convergence. When the weld is complete, the plastic zones are cooled and then removed by conventional scraping tools.

The finished pipe is shown in FIG. 5.

In the absence of quenching, the heat-imparting magnetic field has been found to have several unexpected results. First, molten scale disposed along the converging edges is dispersed by the vibrations of the magnetic field. Secondly, the field induces opposed electrical currents, one of which is concentrated in the seam edges and the others in the dispersed scale particles. These opposed currents cause the scale particles to be repelled from the vicinity of the edge by imparting a motion to the dispersed scale particles which forces them to the inside and outside of the converging seam. Thirdly, the fluctuating magnetic field causes vibration of the tubular blank which inhibits growth of large bond weakening metallic crystals.

Under conventional welding methods, when metal is heated in the solid state to a temperature approaching that of its plastic state, crystal growth within the metal occurs at a rapid rate and produces large elongate crystals of relatively low yield strength. To minimize such growth, the prior art has avoided the heating of large areas adjoining the plasticized zones of the weld. It has been discovered in the present process that the vibrations imparted to the tubular blank by the fluctuating magnetic field prevent such crystal growth, while making available the advantages which flow from heating areas contiguous to the plasticized zones.

It will be recognized that as the depth of the scale layer on the converging seam edges increases, the difficulty of squeezing out this scale correspondingly increases. The process of this invention can readily be adapted to such increased scale thicknesses by the expedient of increasing the depth of the heated plastic layer to a thickness where its extruded mass will displace all of the scale.

When the weld passes from the squeeze rolls, it is in a heated ductile state where it may be readily worked without damage to the weld. As distinguished from known processes having quenched, cooled welds of brittle and stressed character, the pipe of the present invention can be easily sized and bent to conform to the piping right-of-way without the danger of cracking or overstressing the weld.

I claim:

1. The method of welding pipe from a steel tubular blank having opposed edges, comprising the steps of: heating outer zones of metal at each of said edges to the plastic state; simultaneously heating to a temperature immediately below the plastic state, inner zones contiguous with said outer zones, said inner zones and outer zones together having a width substantially less than the width of said tubular blank and said inner zones having a heat content exceeding that heat produced by heat outflow from said outer zones; pressure-welding said edges by forcing said edges together from points on said tubular blank outside of and between said zones on one edge of said tubular blank and the zones on the other edge of said tubular blank; and, subjecting said pipe only to ambient temperature during said welding and after said welding at least until metal temperature has cooled below critical temperature.

2. The method of welding according to claim 1 and wherein said heating steps include passing said tubular blank through a fluctuating magnetic field before the seam is closed, the fluctuating magnetic field having a constant frequency of oscillation in the range of about 3 k.c. to about 450 k.c.

3. The method of welding according to claim 1 and wherein the pressure step includes applying sufficient pressure to displace the first zones and to bond the second zones.

4. The product of the process of claim 1 and characterized by a weld having a substantially pure solid metal interface extending the entire width of the pipe wall.

5. In a method of welding a steel tubular blank having opposed open and joinable seam edges wherein plasticized zones extending the width of the blank wall at the opposed edges of the seam are converged under pressure sufficient to extrude substantial portions of the plasticized zones and weld the joinable edges, the improvements comprising: establishing, before said convergence, inner heated zones contiguous to the plasticized zones having heat energy in excess of that produced by the normal heat flow from said plasticized zones to the remainder of said tubular blank, said inner heated zones each being proximate the opposite edges of said tubular blank having an area of said blank in a substantially nonheated state therebetween and subjecting said pipe only to ambient temperature during said welding and after said welding at least until said metal temperature was cooled below critical temperature.

6. In a process of welding pipe comprising: forming a generally tubular blank of steel having an open longitudinal seam with opposed edges; converging said edges continuously along the length of said tubular blank; establishing outer plastic state zones extending the width of said blank wall at the opposed edges prior to and during said convergence; establishing inner heated zones heated to a temperature immediately below the plastic state said inner heated zones each contiguous to an outer plastic state zone and having between said heated zones an area of substantially nonheated tubular blank; vibrating said blank at a constant frequency within the range of 3 k.c. to 450 k.c. to arrest the growth of large metallic crystals in said heated zones and to disperse molten scale particles disposed along the converging edges, inducing opposed alternating currents at said edges, one of said currents flowing along said edges and between their point of convergence and the remaining currents induced in said dispersed molten scale particles along said edges whereby said scale particles are moved to the inside and outside of the tubular blank and away from said converging edges; brining said opposed edges together under pressure sufficient to extrude said plastic zones and pressure weld said edges at said heated zones; and, subjecting said plasticized zones and said heated zones only to ambient temperature during and after said welding until metal temperature has cooled below critical temperature.

7. In a process of welding pipe comprising: forming a generally tubular blank of steel having an open longitudinal seam with opposed edges, converging said edges continuously along the length of said tubular blank; establishing plastic state zones extending the width of said blank wall at the opposed edges prior to and during said convergence and establishing heated zones immediately contiguous to the plastic zones, said heated zones heated to a temperature immediately below the plastic state and having a heat content exceeding that heat content produced by heat flow from said plastic zones to said heated zones, passing said tubular blank through a fluctuating magnetic field before the seam is closed, the fluctuating magnetic field having a constant frequency of oscillation preselected in the range of about 3 k.c. to about 450 k.c.; and bringing said opposed edges together under pressure by forcing said tubular blank together from points on said tubular blank outside of and between said paired plastic state and heated zones on one edge and said paired plastic state and said heated zones on the other edge sufficient to extrude said plastic zones and pressure weld said edges at said heated zones and subjecting said pipe only to ambient temperature during said welding and after said welding at least until metal temperature has cooled below critical temperature.

8. The process of welding pipe according to claim 7 and wherein said frequency of oscillation is in the optimum range of 3 k.c. to 100 k.c.

9. In a process of welding pipe comprising: forming a generally tubular blank of steel having an open longitudinal seam with opposed edges; converging said edges continuously along the length of said tubular blank; establishing plastic state zones extending the width of said blank wall at the opposed edges prior to and during said convergence, establishing heated zones immediately contiguous to the plastic zones, said heated zones heated to a temperature immediately below the plastic state and having a heat content exceeding the heat content produced by heat flow from said plastic zones through said heated zones to areas of said tubular blank therebetween, and vibrating said blank at a frequency within the range of 3 k.c. and 450 k.c. to arrest the growth of large metallic crystals in said heated zones and to disperse molten scale particles disposed along the converging edges by passing said tubular blank through a fluctuating magnetic field before the seam is closed, the fluctuating magnetic field having a constant frequency of oscillation preselected in the range of about 3 k.c. to about 450 k.c.; bringing said opposed edges together under pressure sufficient to extrude said plastic zones and pressure-weld said edges at said heated zones and subjecting said pipe only to ambient temperature during said welding and after said welding until metal temperature has cooled below critical temperature.

* * * * *